Figure 1:
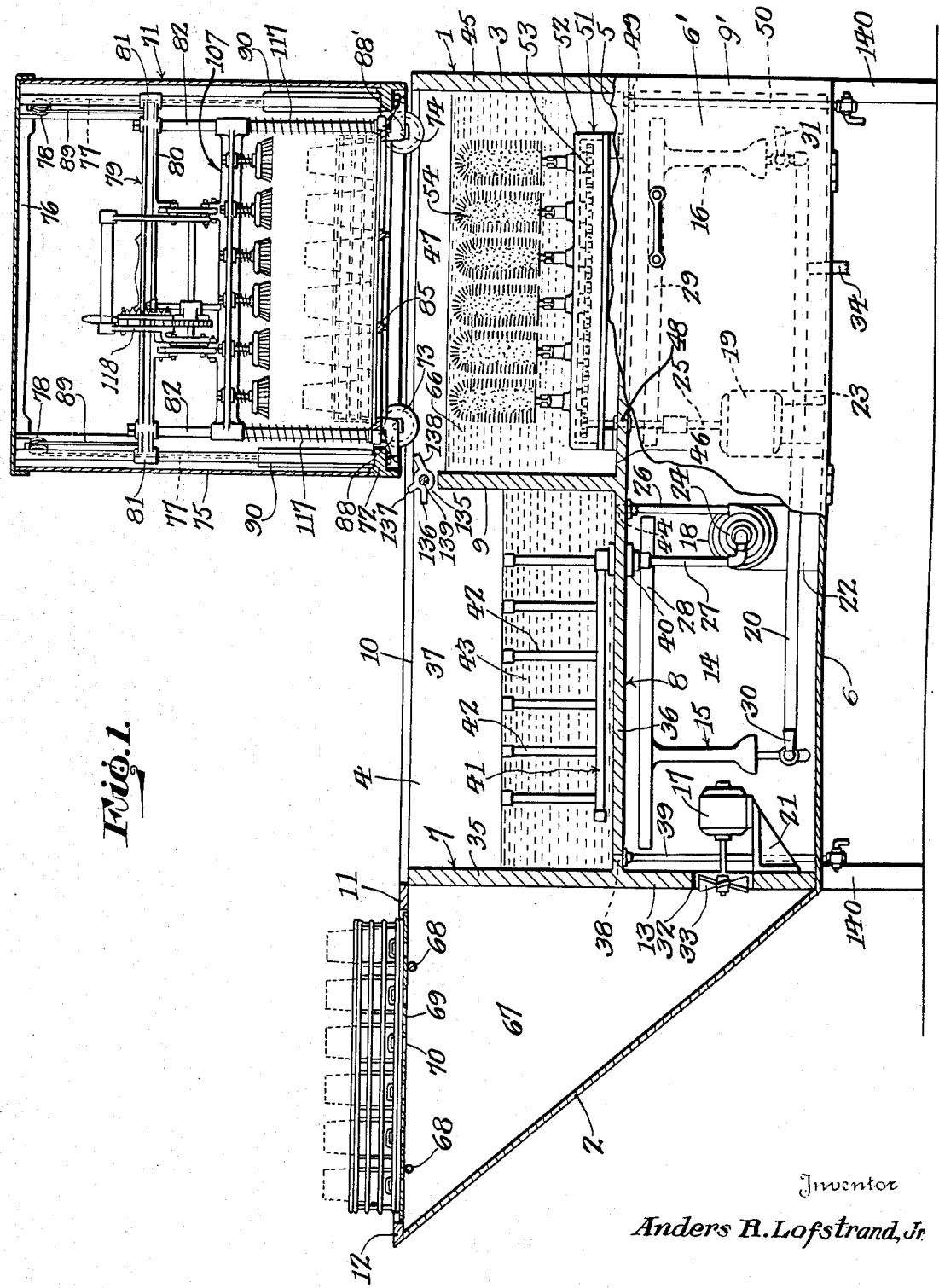

Sept. 1, 1936. A. R. LOFSTRAND, JR 2,052,835
MACHINE FOR WASHING, RINSING, AND DRYING GLASSWARE
Filed Aug. 21, 1934 3 Sheets-Sheet 1

Inventor
Anders R. Lofstrand, Jr.
By Geo. P. Kimmel
Attorney

Sept. 1, 1936. A. R. LOFSTRAND, JR 2,052,835
MACHINE FOR WASHING, RINSING, AND DRYING GLASSWARE
Filed Aug. 21, 1934 3 Sheets-Sheet 2

Inventor
Anders R. Lofstrand, Jr.
By Geo. P. Kimmel
Attorney

Sept. 1, 1936. A. R. LOFSTRAND, JR 2,052,835
MACHINE FOR WASHING, RINSING, AND DRYING GLASSWARE
Filed Aug. 21, 1934 3 Sheets-Sheet 3

Inventor

Anders R. Lofstrand, Jr.

By Geo. P. Kimmel
Attorney

Patented Sept. 1, 1936

2,052,835

UNITED STATES PATENT OFFICE 2,052,835

MACHINE FOR WASHING, RINSING, AND DRYING GLASSWARE

Anders R. Lofstrand, Jr., Washington, D. C., assignor, by mesne assignments, to Lofstrand Company, a corporation of Delaware Application August 21, 1934, Serial No. 740,841

7 Claims. (Cl. 15—76)

This invention relates to a machine for washing, rinsing and drying glassware, and designed primarily for the cleansing of drinking glasses in a sanitary manner, but it is to be understood that the machine may be employed for any purpose for which it is found applicable.

The invention has for its object to provide, in a manner as hereinafter set forth, a machine of the class referred to by means of which a plurality of drinking glasses may be simultaneously, expeditiously and thoroughly washed, rinsed and dried in a sanitary manner.

A further object of the invention is to provide a machine of the class referred to wherein a plurality of drinking glasses are supported upon a metallic tray. The tray supporting the glasses is capable of being selectively positioned to have the glasses successively acted upon by washing, rinsing and drying agents therefor without the glasses being touched by human hands, thereby enabling the employment of washing, rinsing and drying agents of extremely high temperature without likelihood of breakage of the glasses or injury to the operator of the machine.

A further object of the invention is to provide, in a manner as hereinafter set forth, a machine of the class referred to including a supporting means for the glasses of a form to provide a metal to glass contact during the washing, rinsing and drying operations thereby preventing the breaking or cracking of the glasses during the cleansing of the latter.

A further object of the invention is to provide, in a manner as hereinafter set forth, a machine of the class referred to whereby heating means for washing and rinsing waters is utilized for heating air which is to be employed for drying the glasses after they have been subjected to a rinsing action.

A further object of the invention is to provide, in a manner as hereinafter set forth, a machine of the class referred to including means for supporting the glasses to be acted upon in such a manner that all portions of the glasses, interiorly and exteriorly thereof, will be subjected to washing, rinsing and drying actions therefor.

A further object of the invention is to provide, in a manner as hereinafter set forth, a machine of the class referred to with adjustable latchable means for maintaining groups of glasses of varying heights upon a supporting tray during the subjecting of the group to washing and rinsing operations.

A further object of the invention is to provide, in a manner as hereinafter set forth, a machine of the class and for the purpose referrred to including a carriage, an elevator connected therewith for carrying a tray employed for supporting a group of glasses to be acted upon, and an adjustable latchable means attached to and bodily moving with the elevator for maintaining the group on the tray when the glasses are subjected to washing and rinsing operations.

A further object of the invention is to provide, in a manner as hereinafter set forth, a machine of the class and for the purpose referred to including a pressure applied vertically movable counterbalanced elevator for submerging a tray carrying a group of glasses into a body of washing water or into a body of rinsing water and with the elevator carrying adjustable latchable means independent of its vertical movement for maintaining the glasses on the tray during the application of washing and rinsing operations to the group.

A further object of the invention is to provide, in a manner as hereinafter set forth, a machine of the class and for the purpose referred to including a washing water compartment, a rinsing water compartment, a heating compartment common to the said other compartments and means whereby the heated air from the heating compartment is utilized for drying the articles which have been washed or rinsed.

Further objects of the invention are to provide, in a manner as hereinafter set forth, a machine for the purpose referred to which is comparatively simple in its construction and arrangement for the purpose intended thereby, strong, durable, compact, thoroughly efficient in its use, conveniently operated, readily assembled, capable of being quickly repaired when occasion requires, and comparatively inexpensive to set up.

To the foregoing ends essentially, and to others which may hereinafter appear, the invention consists of such parts, and such combination of parts which fall within the scope of the invention as claimed.

In the drawings:—

Figure 2:
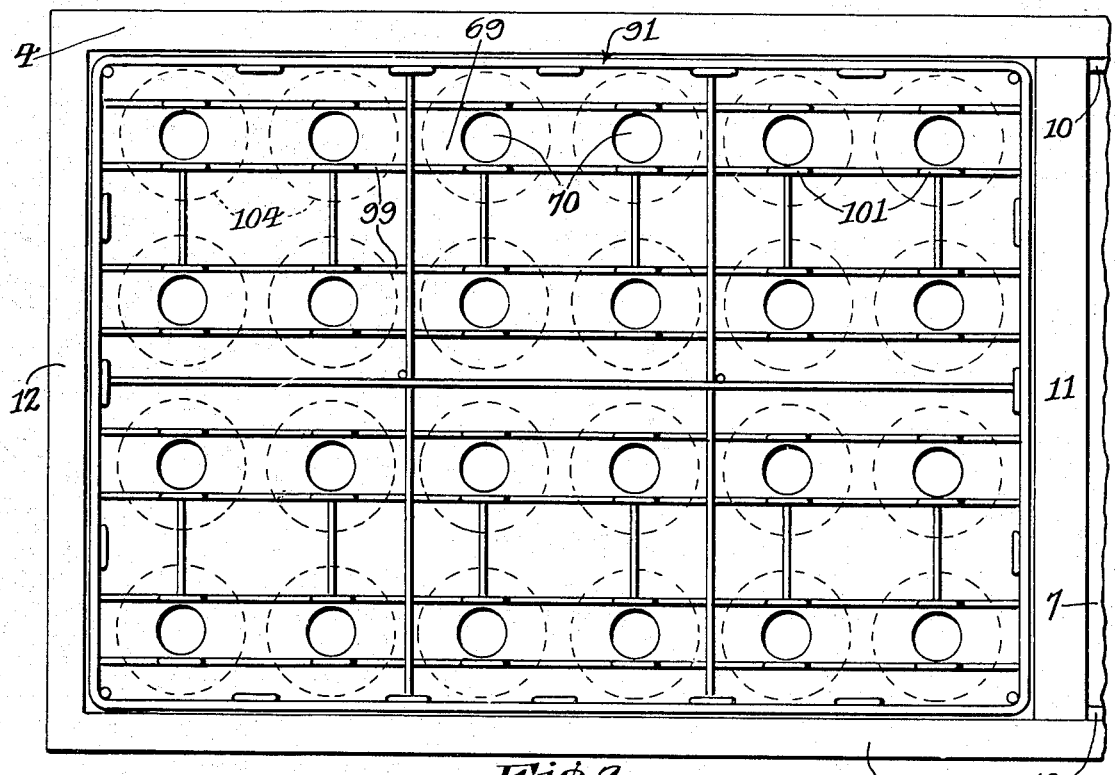
Figure 3:
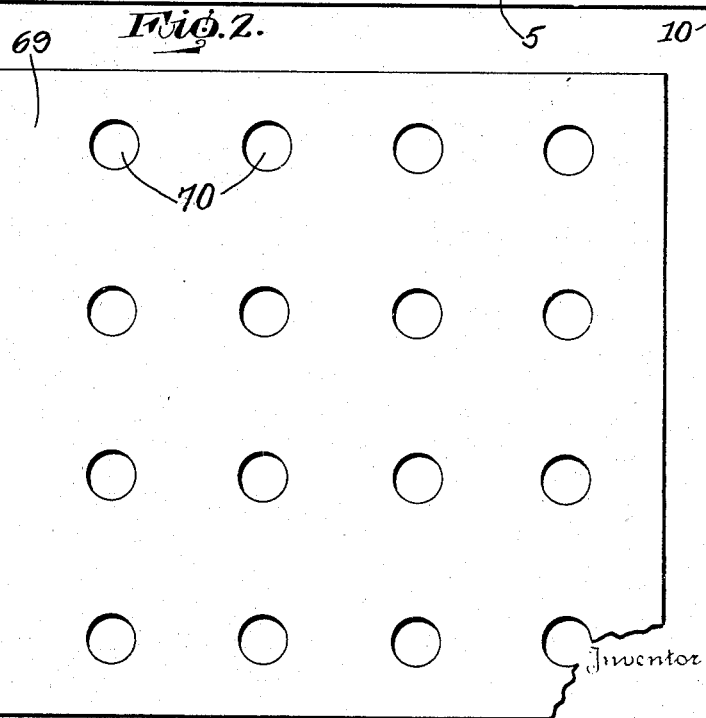
Figure 4:
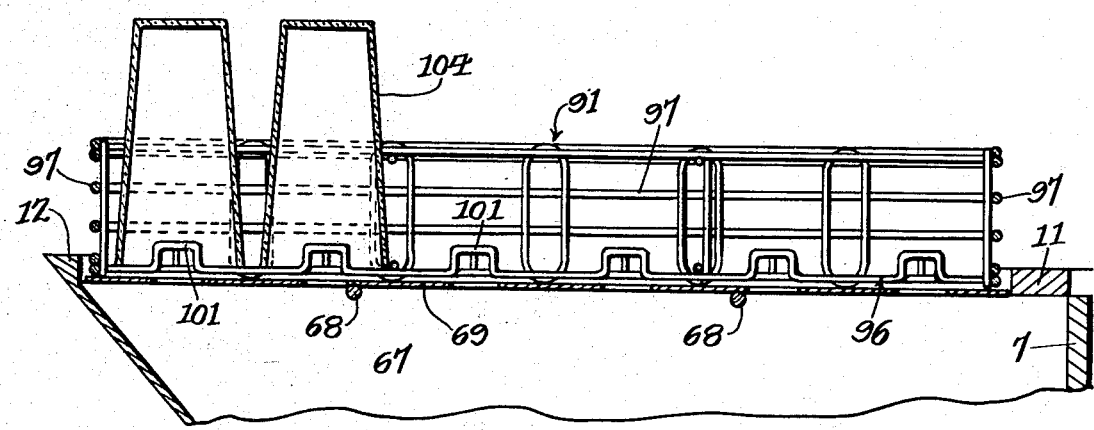
Figure 5:
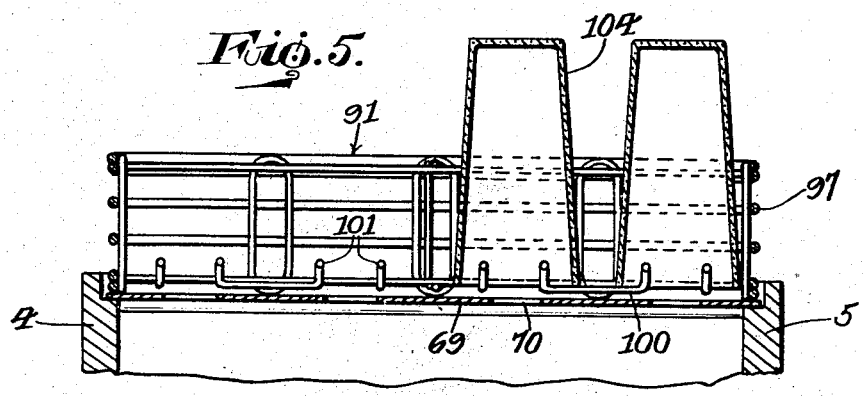

Figure 1 is a lengthwise sectional view of the machine,

Figure 2 is a fragmentary view in top plan of the machine showing the supporting tray for the glasses in superimposed relation with respect to the removable closure plate for the top of the heated air receiving compartment, Figure 3 is a top plan view of the removable closure plate for the top of the heated air receiving compartment, Figure 4 is a fragmentary view in lengthwise section showing the top of the heated air receiving compartment, the removable closure plate for the latter, the supporting tray for the glasses and a plurality of glasses mounted in the tray, and Figure 5 is a view similar to Figure 4, but taken at right angles thereto.

The machine includes an open top housing 1 formed of a pair of end walls 2, 3, a pair of side walls 4, 5, and a bottom 6. The wall 2 inclines outwardly from its lower to its upper end. The wall 3 is vertical and its upper end aligns with the upper end of wall 2. One end of each of the side walls is inclined in the same direction as the end wall 2. The wall 4 is formed continuous. The wall 5 is formed with a rectangular part thereof to provide a hinged closure 6', but the remaining portion of such wall is continuous. Within the housing 1 is a vertical partition 7 arranged in parallel spaced relation to wall 3. Positioned between the partition 7 and end wall 3 is a flat horizontally disposed partition 8 which extends from the wall 4 to the wall 5. The partition 8 aligns with the transverse median of wall 3 and partition 7. Mounted on the partition 8, at the transverse median of the latter is a vertical partition 9 of less height than the partition 7. A metallic strip 9' is secured to wall 3 and opposes one edge of closure 6'. The upper ends of the walls 4, 5 are provided with track members 10 extending from a transversely disposed brace member 11 to the wall 3. The member 11 at one side seats upon the partition 7 and provides a stop. The upper end of wall 3 also provides a stop arranged in parallel spaced relation to the said other stop. The purpose of the stops will be presently referred to. The top of end wall 2 is enlarged as at 12 and forms a flush continuation of the upper ends of the walls 4, 5. The track members 10 are arranged below and in proximity to the top edges of walls 4, 5.

The bottom 6 in connection with the lower portion of the end wall 3, the lower portion of the side wall 4, the hinged closure 6' forming a part of the side wall 5, the lower portion 13 of the partition 7 and the partition 8 provides an air heating compartment 14 in which are arranged a pair of spaced gas burners 15, 16, three spaced electric motors 17, 18 and 19, a gas pipe 20 connecting the burners 15, 16 together, supports 21, 22 and 23 for the motors 17, 18 and 19 respectively, a pump 24 operated from motor 18, a power transmission 25 leading from and operated by motor 19, a water intake pipe 26 leading the pump 24, and a water discharging pipe 27 extended from the pump 24. The burners 15, 16 have enlarged heads 28, 29 respectively and independent cut-offs 30, 31 respectively. The lower portion 13 of partition 7 is formed with an opening 32 providing an air outlet for chamber 14. Within opening 32 is arranged a fan 33 operated from motor 17. A gas supply line 34 opens into pipe 20.

That portion of the side walls 4, 5 between the upper portion 35 of partition 7 and the partition 9 in connection with the said portion 35, partition 9 and part 36 of the partition 8 provide a rinsing compartment 37 having its bottom formed by said part 36. The latter has an opening 38 in which is extended the open upper end of a valve controlled rinsing water draw-off pipe 39 extending down through compartment 14 to below bottom 6. Anchored to and arranged above and below said part 36 as well as extending through the latter is a tubular casting 40 into which opens pipe 27. Supported by casting 40 within and in spaced relation over the bottom of compartment 37 is a nozzle structure 41 which communicates with said casting. The structure 41 includes a series of spaced upstanding nozzle elements 42 adapted to be extended into the washed glasses for supplying rinsing water therein. Within compartment 37 is a body of rinsing water 43 of a depth to submerge the nozzle structure 41. The part 36 of partition 8 is formed with an opening 44 into which extends the open upper end of pipe 26. On the operation of pump 24 from the motor 18 rinsing water will be drawn from compartment 37 and returned thereto by the nozzle elements 42. The elongated burner head 28 is positioned in close proximity to part 36 for heating the rinsing water 43.

The portions of the side walls 4, 5 between the partition 9 and upper part 45 of the end wall 3, in connection with the said part 45, partition 9 and part 46 of partition 8 provide a washing compartment 47 having its bottom formed by the said part 46. The latter has an opening 48 for the passage of the power transmitting means 25 into the lower part of compartment 47. The part 46 is also formed with an opening 49 into which is extended the open upper end of a valve controlled washing water draw-off pipe 50 extending down through compartment 14 to below the bottom 6. Supported upon the bottom of compartment 47 in any suitable manner to prevent it from shifting is a scrubber structure 51 for the article to be washed. The scrubber structure is of that form to act upon the inner and outer faces of the articles, that is the glasses. The structure includes a skeleton housing 52 in which is arranged a gear drive 53 operated from the transmission 25 and acting to rotate spaced brushes 54 arranged in rows to act upon the inner and outer faces of and for revolving the glasses 104.

A body of washing water 66 is arranged in compartment 47. The structure 51 is submerged in the water 66. The burner head 29 is arranged in close proximity to the part 46 for heating the water 66.

The burners 15 and 16 are not only employed for heating the waters 43 and 66, but also act to heat the air in compartment 14, and the said heated air is employed for drying the glasses after the latter have been rinsed.

The portions of the side walls 4, 5 between the end wall 2 and partition 7 provide in connection with wall 2 and partition 7 an open top compartment 67 for the reception of and passage of the heated air supplied from the compartment 14 under force of the action of the fan 33. Extending transversely of the open top of compartment 67 is a pair of spaced parallel supports 68 of circular cross section. Arranged in the open top of compartment 67 and seated upon the supports 68 is a removable perforated closure plate 69 positioned between the walls 4, 5, enlargement 12 and brace member 11. The plate 69 when in position at the top of compartment 67 is arranged below the top edges of the walls 2, 4 and 5 and upper face of member 11 whereby shifting of said plate is arrested. The openings in plate 69 are designated 70 and are arranged in equi-distant spaced rows extending lengthwise of the plate and with the openings of each row arranged equi-distant from each other. The end wall 2 functions to deflect the heated air received in compartment 67 in a direction towards said plate.

The length of compartment 67 gradually decreases from its top to its bottom.

As is well known in washing, rinsing and drying machines, a carriage is employed for shifting a group of glasses from the open top of the washing compartment to the open top of the rinsing compartment, and the carriage is not only provided with an elevator for the purpose of lowering and elevating a group of glasses into and out of the washing compartment and for elevating and lowering the washed glasses into and out of the rinsing compartment, but it is also provided with a means for lowering the elevator and for holding the glasses in the washing compartment to be washed or in the rinsing compartment to be rinsed. One form of carriage, by way of example and for the purpose referred to, is shown in Figure 1 and is designated 71. The carriage includes a bottom in the form of a rectangular frame 72, a pair of sides 75 extending upwardly from the central portion of the ends of the frame 72 and a crosshead 76 connecting the upper ends of the sides together. The body of the frame is of angle shape in cross-section. The sides are of channel shape opening inwardly, and are oppositely disposed. Fixed to the ends of the frame 72 and arranged in the sides 75 are vertically disposed guide rods 77. Supported within the upper ends of the sides 75 are pulleys 78. The frame 72 at one end is provided with a pair of traction wheels 73, only one of which is shown. The frame 72 at its other end is provided with a pair of traction wheels 74, only one of which is shown. The wheels 73 and 74 travel on the tracks 10. The movement of the carriage in one direction is arrested by the wheels 73 abutting the stop provided by one side of the brace 11 whereby the position of carriage 71 will be at the open top of the compartment 37. The movement of the carriage 71 in the opposite direction is arrested by the wheels 74 abutting the stop formed by the upper end of the wall 3 whereby the position of the carriage 71 will be at the open top of the compartment 47.

The vertically movable elevator arranged within the carriage is indicated at 79 and is of the counter-balanced type. The elevator includes a crosshead 80 which is slidably mounted at its ends on the guide rods 77. Flexible members 89 travel over the pulleys 78 and have connected to the lower or inner ends thereof the counter weights 90. The flexible members 89 are anchored to the crosshead 80. Depending from the crosshead 80 are spaced parallel combined suspension and guide rods 82 which are anchored at their lower ends to a cradle 85 for passage through the frame 72. Controlling springs 117 are confined on rods 82. The cradle 85 constitutes the bottom of the elevator and is adapted to have removably mounted thereon a tray carrying a group of glasses to be washed, rinsed and dried. The cradle is provided with a pair of trips 88, 88'.

The tray which is removably mounted on the cradle 85 will be of a construction similar to that as disclosed in my co-pending application, Serial No. 740,840, filed August 21, 1934. The capacity of the tray will be twenty-four drinking glasses. The tray is generally indicated at 91. The tray has skeleton side and end walls and a skeleton bottom. The side and end walls are indicated at 97 and the bottom at 100. The bottom is formed from spaced parallel wires and each wire is formed with a series of spaced upstanding inverted yokes 101 which constitute stops. When the glasses are positioned in the tray, a metal to glass contact is provided thereby reducing possibility of the glasses cracking or breaking to a minimum. The tray is for receiving drinking glasses in inverted position. The spaces between the wires forming the bottom of the tray provide passages for brushes to act upon the outer and inner faces of the glasses when the tray is lowered into the washing compartment.

Arranged within the carriage 71 is a vertically movable spring controlled resilient structure 107 slidably mounted on the rods 82 and bearing against the springs 117. The structure is of a form to maintain the glasses in the tray and also for cleaning the exterior of the glasses at the upper portions of the latter.

Within the carriage 71 and connected to elevator 79 and structure 107 is a setting or adjusting and retaining mechanism 118 for the structure 107. The mechanism 118 releasably latches the structure 107 in yielding contact with the glasses to prevent the latter from being shifted out of the tray, as well as tending to maintain the tray on the cradle. The mechanism 118 will be of the same construction and arrangement as is set forth in my co-pending application, Serial No. 740,842, filed August 21, 1934, which has matured into Patent No. 2,019,423, granted October 29, 1935.

Arranged over the top edge of partition 9 is an oppositely rotatable collar 135 formed with a series of arms 136, 137 and 138. The collar 135 is fixed to a rotatable shaft 139 journaled in the housing 1 and connected to a reversible switching device, not shown, for controlling the operation of the motors 18 and 19. Suitable circuit connections, not shown, lead from the switching device to said motors. The switching device is of that type for closing the circuit to motor 19 when the elevator 79 lowers into the compartment 47 and for opening the circuit to motor 19 when elevator 79 moves out of compartment 47. The switching device is also of that type for closing the circuit to motor 18 when elevator 79 lowers into compartment 37 and for opening the circuit to motor 18 when elevator 79 moves out of compartment 37. It is thought unnecessary to show the switching device and circuit connections as they are of conventional form. The operation of shaft 139 is controlled by collar 135 and the operation of collar 135 is controlled by the trips 88, 88'. The trip 88 associates with the arm 138 and the trip 88' associates with the arm 136. The arm 137 is provided to enable the manual shift of collar 135 in either direction. With the elevator 79 in the position shown in Figure 1, the trip 88 is arranged over the arm 138. On the lowering of elevator 79 trip 88 will engage arm 138 and rotate collar 135 in a clockwise direction whereby shaft 139 will be shifted likewise and actuate the switching device in a direction to close the circuit to the motor 19 resulting in the transmission 25 operating the brushes 54, 55. As the elevator 79 moves downwardly it will provide for the brushes to pass upwardly through the tray 91 and act upon the glasses to clean the latter while the glasses are submerged in the washing water 66. The brushes during the revolving thereof will also act to revolve the glasses as the structure 107 does not bind to an extent against the glasses to prevent the revolving of the latter. When the washing operation has been completed the applied force employed for the downward movement of the elevator is removed and the counterweights 90 will raise the latter. If desired elevator 79 may be manually moved upward. On the upward movement of elevator 79 the trip 88 will engage and carry arm 138 to shift collar 135 and shaft 139 in a counterclockwise direction to an extent to provide for the actuation of the switching device in a direction to open the circuit to the motor 19. When the elevator 79 has been moved upwardly to the position shown in Figure 1, the carriage 71 is then moved horizontally to dispose the elevator 79 over the top of compartment 37 for the purpose of lowering it to subject the washed glasses to a rinsing operation. When elevator 79 has been positioned over compartment 37 the arm 136 of collar 135 is arranged in the path of trip 88'. Elevator 79 is then lowered to subject the washed glasses to the rinsing water 43. As elevator 79 moves downwardly in compartment 37 the trip 88' engages arm 136 and moves collar 135 and shaft 139 in a counterclockwise direction for the purpose of actuating the switching device in a direction to close the circuit to motor 18. On the lowering of elevator 79 into compartment 37 the nozzle elements 42 will extend up through the bottom of the tray into the glasses. On the closing of the circuit to motor 18, the pump 24 will be operated to force the rinsing water 43 through the nozzle elements 42. After the rinsing operation has been completed the elevator 79 is moved upwardly whereby trip 88' will engage arm 136 and shift collar 135 and shaft 139 in a clockwise direction for the purpose of actuating the switching device in a direction to open the circuit to the motor 18. When the elevator 79 with the rinsed glasses thereon has been removed from within to the top of compartment 37, the tray 91 with the rinsed glasses thereon is removed from the cradle 85 and positioned upon the plate 69 arranged at the top of compartment 67. The motor 17 is then thrown into operation whereby fan 33 is actuated to force the heated air from compartments 14 and 67 up through the openings 70 of plate 69 into the rinsed glasses for drying the latter. When the tray 91 is positioned upon plate 69 the open ends of the glasses are positioned directly over and arranged concentrically to the openings 70. These latter are of less diameter than the open ends of the glasses. Suitable controllable circuit connections, not shown, are provided for motor 17.

The housing 1 is elevated from off the floor by suitable uprights or legs 140.

What I claim is:—

1. In a machine for washing, rinsing and drying glassware, a structure comprising inner and outer spaced vertically disposed parallel end walls, spaced vertically disposed parallel front and rear walls connected at one end to said outer end wall and inwardly adjacent their other ends connected to said inner end wall whereby portions of the front and rear walls will extend outwardly from the said inner end wall, a bottom having a horizontally disposed flat portion connected to the lower ends of the said several walls, a flat horizontally disposed partition arranged in superposed spaced relation to said portion of said bottom positioned between and connected to the said several walls, a vertical partition positioned upon said horizontal partition at the transverse center of the latter and connected to said front and rear walls, the said partitions in connection with a part of each of the said several walls providing the upper portion of said structure in the form of endwise opposed washing water and rinsing water receiving compartments, said horizontal partition in connection with the said portion of said bottom and another part of the said several walls providing the lower portion of said structure in the form of a closed heating chamber common to and arranged below the said compartments, the said portions of the said front and rear walls and the remaining portion of said bottom in connection with said inner end wall providing an open top heated air receiving chamber parallel to the corresponding ends of the said rinsing water receiving compartment and heating chamber, said inner end wall being provided in its lower portion with an opening for establishing communication between said chambers, and heating means arranged in proximity to the bottoms of said compartments providing for heating of the water in said compartments and the air in said heating chamber.

2. In a machine for washing, rinsing and drying glassware, a structure comprising inner and outer spaced vertically disposed parallel end walls, spaced vertically disposed parallel front and rear walls connected at one end to said outer end wall and inwardly adjacent their other ends connected to the said inner end wall whereby portions of the front and rear walls will extend outwardly from the said inner end wall, a bottom having a horizontally disposed flat portion connected to the lower ends of the said several walls, a flat horizontally disposed partition arranged in superposed spaced relation to the said portion of said bottom and positioned between and connected to the said several walls, a vertical partition positioned upon said horizontal partition at the transverse center of the latter and connected to said front and rear walls, said partitions in connection with a part of each of the said several walls providing the upper portion of said structure in the form of endwise opposed washing water and rinsing water receiving compartments, said horizontal partition in connection with the said portion of said bottom and another part of each of the said several walls providing the lower portion of said structure in the form of a closed heating chamber common to and arranged below said compartments, the extended portions of said front and rear walls being in the form of triangular shaped extensions located outwardly adjacent said inner end wall, the remaining portion of said bottom being in the form of an upwardly inclined extension located outwardly adjacent said inner end wall, the said several extensions coacting with each other and with said inner end wall to provide an open top heated air receiving chamber gradually increasing in area towards its open top, said inner end wall being formed with an opening below said rinsing water receiving compartment for establishing communication between said chambers, heating means arranged within the heating chamber common to said compartments for heating the water in said compartments and for the heating of air in said heating chamber, and means for forcing the heated air from the heating chamber into said receiving chamber.

3. In a machine for washing, rinsing and drying glassware, a structure comprising inner and outer spaced vertically disposed parallel end walls, spaced vertically disposed parallel front and rear walls connected at one end to said outer end wall and inwardly adjacent their other ends connected to said inner end wall whereby portions of the front and rear walls will extend outwardly from the said inner end wall, a bottom having a horizontally disposed flat portion connected to the lower ends of the said several walls, a flat horizontally disposed partition arranged in superposed spaced relation to said portion of said bottom positioned between and connected to the said several walls, a vertical partition positioned upon said horizontal partition at the transverse center of the latter and connected to said front and rear walls, the said partitions in connection with a part of each of the said several walls providing the upper portion of said structure in the form of endwise opposed washing water and rinsing water receiving compartments, said horizontal partition in connection with the said portion of said bottom and another part of the said several walls providing the lower portion of said structure in the form of a closed heating chamber common to and arranged below the said compartments, the said portions of the said front and rear walls and the remaining portion of said bottom in connection with said inner end wall providing an open top heated air receiving chamber parallel to the corresponding ends of the said rinsing water receiving compartment and heating chamber, said inner end wall being provided in its lower portion with an opening for establishing communication between said chambers, heating means arranged in proximity to the bottoms of said compartments providing for heating of the water in said compartments and the air in said heating chamber, a perforated plate within the open top of the heated air receiving chamber, and supports for said plate within and below the top of the heated air receiving chamber.

4. In a machine for washing, rinsing and drying glassware, a structure comprising inner and outer spaced vertically disposed parallel end walls, spaced vertically disposed parallel front and rear walls connected at one end to said outer end wall and inwardly adjacent their other ends connected to said inner end wall whereby portions of the front and rear walls will extend outwardly from the said inner end wall, a bottom having a horizontally disposed flat portion connected to the lower ends of the said several walls, a flat horizontally disposed partition arranged in superposed spaced relation to the said portion of said bottom and positioned between and connected to the said several walls, a vertical partition positioned upon said horizontal partition at the transverse center of the latter and connected to said front and rear walls, said partitions in connection with a part of each of the said several walls providing the upper portion of said structure in the form of endwise opposed washing water and rinsing water receiving compartments, said horizontal partition in connection with the said portion of said bottom and another part of each of the said several walls providing the lower portion of said structure in the form of a closed heating chamber common to and arranged below said compartments, the extended portions of said front and rear walls being in the form of triangular shaped extensions located outwardly adjacent said inner end wall, the remaining portion of said bottom being in the form of an upwardly inclined extension located outwardly adjacent said inner end wall, the said several extensions coacting with each other and with said inner end wall to provide an open top heated air receiving chamber gradually increasing in area towards its open top, said inner end wall being formed with an opening below said rinsing water receiving compartment for establishing communication between said chambers, heating means arranged within the heating chamber common to said compartments for heating the water in said compartments and for heating the air in said heating chamber, means for forcing the heated air from the heating chamber into said receiving chamber, a perforated plate within the open top of the heated air receiving chamber, and supports for said plate within and below the top of the heated air receiving chamber.

5. The invention as set forth in claim 1 having a plate mounted in the open upper end of the heated air receiving chamber for supporting washed glasses and formed throughout with equally spaced openings for the passage of air into the washed glasses for drying the latter.

6. The invention as set forth in claim 2 having a plate mounted in the open upper end of the heated air receiving chamber for supporting washed glasses and formed throughout with equally spaced openings for the passage of air into the washed glasses for drying the latter.

7. In a machine for washing, rinsing and drying glassware, a structure provided with coacting parts being so arranged to form a pair of endwise opposed compartments in its upper portion, one for receiving washing water and the other rinsing water, a closed heating chamber arranged below both of and common to the said compartments and an open top heated air receiving chamber disposed in endwise opposed relation to and having its inner end formed by corresponding ends of the said heating chamber and one of said compartments, the said end of said heating chamber having an opening for establishing communication between the said chambers, heating means within said heating chamber and common to said compartments for heating the water in said compartments and for heating the air in the heating chamber, and supporting means at the open top of the heated air receiving chamber for washed glasses, said supporting means being provided with spaced openings for directing the heated air from the receiving chamber into the washed glasses for drying them.

ANDERS R. LOFSTRAND, Jr.